United States Patent
Leitch et al.

(10) Patent No.: US 6,776,225 B2
(45) Date of Patent: Aug. 17, 2004

(54) HEAT EXCHANGER ASSEMBLY

(75) Inventors: Frank Joseph Leitch, North Tonawanda, NY (US); Kunal Ghosh, Amherst, NY (US)

(73) Assignee: Delphi Technologies, Inc., Troy, MI (US)

( * ) Notice: Subject to any disclaimer, the term of this patent is extended or adjusted under 35 U.S.C. 154(b) by 38 days.

(21) Appl. No.: 10/170,600

(22) Filed: Jun. 13, 2002

(65) Prior Publication Data

US 2003/0230402 A1 Dec. 18, 2003

(51) Int. Cl.⁷ ................................................ F28F 9/04
(52) U.S. Cl. ...................... 165/178; 165/148; 165/149; 165/173; 165/175; 165/176; 165/177
(58) Field of Search .................. 165/149, 178, 165/176, 173

(56) References Cited

U.S. PATENT DOCUMENTS

| | | | | |
|---|---|---|---|---|
| 4,485,867 A | * | 12/1984 | Melnyk et al. | 165/173 |
| 4,582,127 A | * | 4/1986 | Moranne | 165/83 |
| 4,625,793 A | * | 12/1986 | Cadars | 165/151 |
| 5,046,555 A | | 9/1991 | Nguyen | 165/173 |
| 5,052,475 A | * | 10/1991 | Grundy | 165/76 |
| 5,095,972 A | * | 3/1992 | Nakaguro | 165/153 |
| 5,151,157 A | * | 9/1992 | le Gauyer | 165/140 |
| 5,163,716 A | * | 11/1992 | Bolton et al. | 285/142.1 |
| 5,170,841 A | * | 12/1992 | Briet | 165/76 |
| 5,174,490 A | | 12/1992 | Koisuka et al. | 228/183 |
| 5,228,727 A | * | 7/1993 | Tokutake et al. | 285/189 |
| 5,251,374 A | | 10/1993 | Halstead et al. | 29/890.047 |
| 5,464,145 A | | 11/1995 | Park et al. | 228/183 |
| 5,477,919 A | * | 12/1995 | Karube | 165/176 |
| 5,538,079 A | * | 7/1996 | Pawlick | 165/153 |
| 5,911,274 A | * | 6/1999 | Inaba et al. | 165/178 |
| 5,941,304 A | * | 8/1999 | Inaba et al. | 165/178 |
| 5,950,713 A | * | 9/1999 | Kato | 165/76 |
| 5,960,864 A | * | 10/1999 | Morita | 165/82 |
| 6,036,083 A | | 3/2000 | Luo et al. | 228/223 |
| 6,123,143 A | | 9/2000 | Insalaco | 165/67 |
| 6,196,306 B1 | * | 3/2001 | Aikawa et al. | 165/178 |
| 6,443,223 B2 | * | 9/2002 | Ichiyanagi | 165/178 |

FOREIGN PATENT DOCUMENTS

JP        6-229696        8/1994

* cited by examiner

Primary Examiner—Nihir B Patel
(74) Attorney, Agent, or Firm—Patrick M. Griffin

(57) ABSTRACT

A heat exchanger assembly for a vehicle comprising at least one manifold having walls defining a chamber for retaining fluid. A mounting device is secured to the wall of the manifold. The mounting device includes a seat portion adapted to receive a fluid transmission line. The mounting device further includes an opening extending from the seat portion and aligned with an aperture in the manifold for providing a fluid passageway between the manifold and the fluid transmission line. In addition, the mounting device includes at least one indentation formed therein for capturing contaminates and preventing an intrusion of the contaminates into the seat portion.

17 Claims, 4 Drawing Sheets

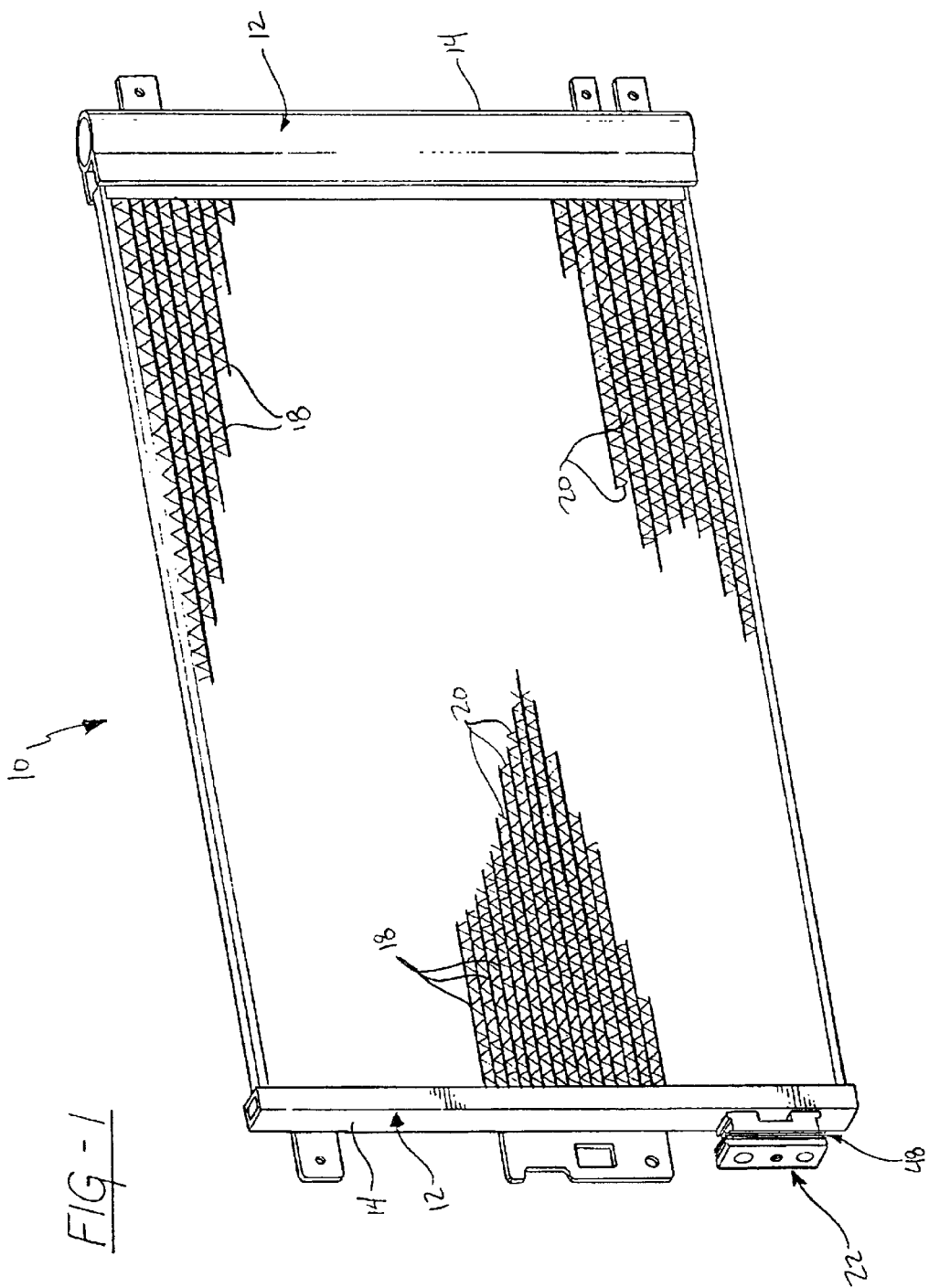

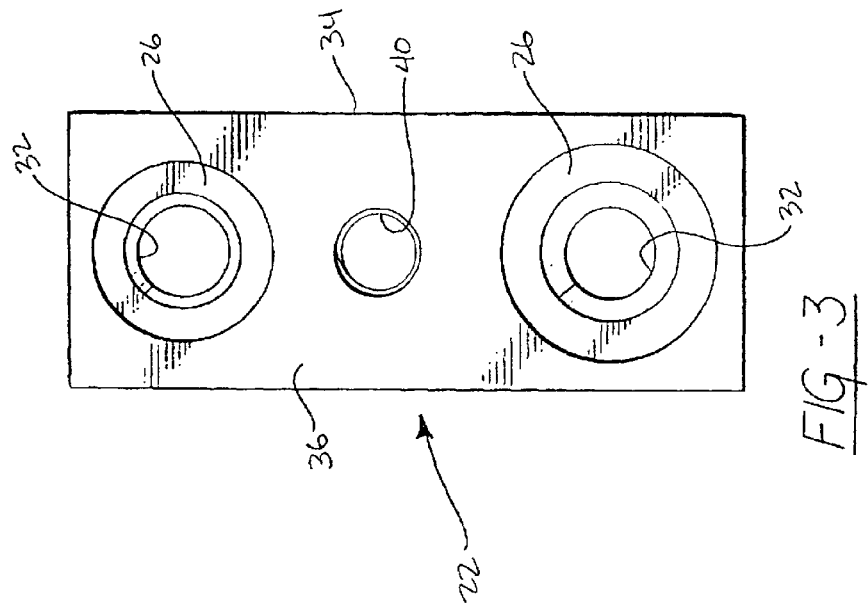
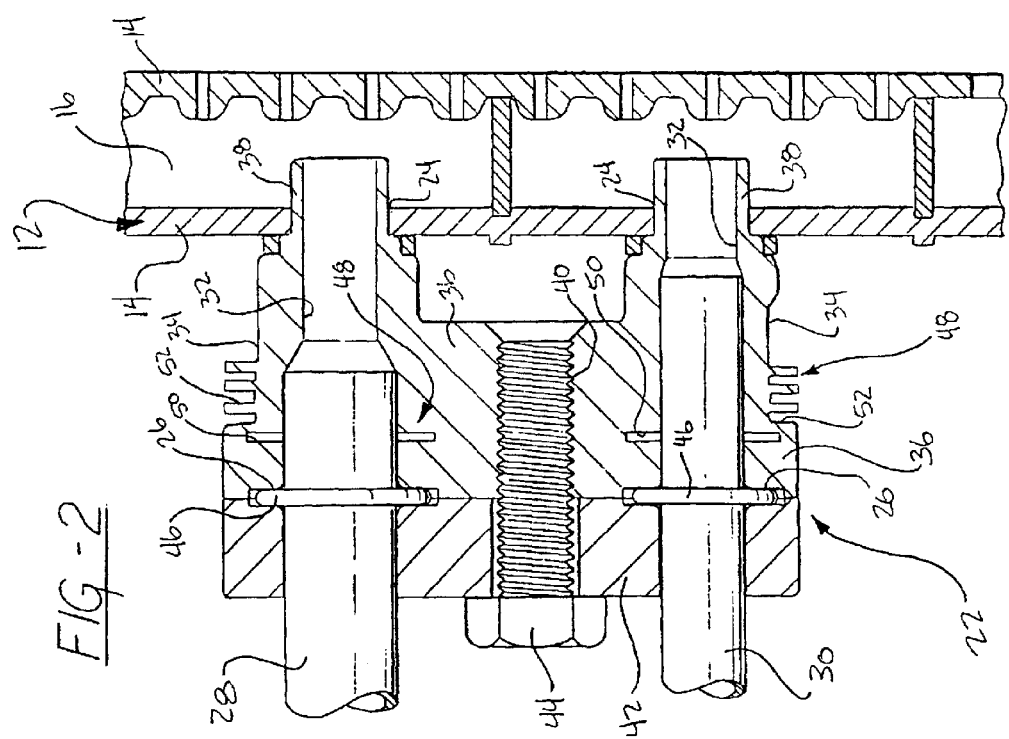

HEAT EXCHANGER ASSEMBLY

BACKGROUND OF THE INVENTION

1. Field of the Invention

The subject invention relates to heat exchangers and in particular to a mounting device for securing fluid transmission lines to a heat exchanger.

2. Description of the Prior Art

Heat exchangers, such as a condenser in an automobile, require the connection of fluid transmission lines such that fluid can flow into and out of the heat exchanger. A mounting device is frequently utilized to provide the connection interface for securing the transmission lines to the heat exchanger. Japanese Publication No. 6-229696 discloses a design of one such mounting device.

Modern heat exchangers often require brazing together of various components, including the mounting device, at the same time. This furnace brazing process is advantageous due to the manufacturing efficiencies it presents. However, brazing the mounting device onto the heat exchanger often results in contaminants, such as clad and/or flux, migrating into critical sealing surfaces. The sealing surfaces of the mounting device, i.e., the seat portion of the device where the transmission lines are connected, are required to be free of any contaminants. If there are contaminants on the seat portion of the mounting device then the interconnection between the transmission lines and device may leak during operation. A post brazing clean-up operation is therefore required to remove any contaminants from the seat portion of the mounting device. The post brazing clean-up operation is expensive and inefficient.

Accordingly, it would be desirable to incorporate a mounting device for fluid transmission lines which can prevent the intrusion of contaminants onto the sealing surfaces during a brazing process.

SUMMARY OF THE INVENTION AND ADVANTAGES

A heat exchanger assembly for a vehicle comprising at least one manifold having walls defining a chamber for retaining fluid therein with at least one of the walls having at least one aperture. A mounting device is secured to the wall of the manifold and is aligned with the aperture. The mounting device includes at least one seat portion adapted to receive a fluid transmission line. The mounting device further includes an opening extending from the seat portion and aligned with the aperture for providing a fluid passageway between the manifold and the fluid transmission line. In addition, the mounting device includes at least one indentation formed therein for capturing contaminants and preventing an intrusion of the contaminants into the seat portion.

Accordingly, the subject invention incorporates a mounting device for a fluid transmission line having an indentation to prevent the intrusion of contaminants onto a sealing surface, especially during a brazing process.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 is a perspective view of a heat exchanger assembly in accordance with the subject invention;

FIG. 2 is a fragmented cross-sectional view of the heat exchanger assembly of FIG. 1 with a mounting device secured thereto;

FIG. 3 is a top view of the mounting device from the heat exchanger assembly of FIG. 1;

DETAILED DESCRIPTION OF THE PREFERRED EMBODIMENT

Figure 4:
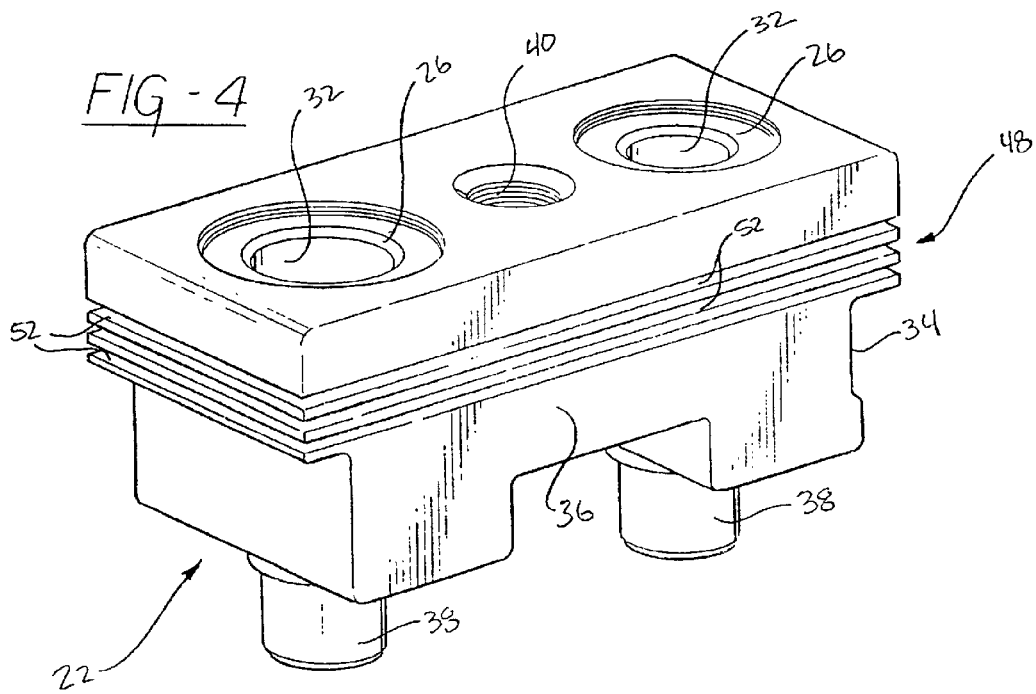
FIG. 4 is a perspective view of the mounting device from the heat exchanger assembly of FIG. 1.

Referring to the Figures, wherein like numerals indicate like or corresponding parts throughout the several views, a heat exchanger assembly is generally shown at 10 in FIG. 1. The heat exchanger assembly 10, as illustrated, is preferably a condenser for a vehicle such as an automobile. Heat exchanger assemblies 10 of this type include a pair of opposing manifolds 12. The manifolds 12 have walls 14 which define chambers 16 for retaining fluid therein. These manifolds 12 may be of any suitable design or configuration and are preferably made of metal. A plurality of metal tubes 18 interconnect the manifolds 12 and are in fluid communication with the chambers 16. In addition, a plurality of metal corrugated fins 20 interconnect the tubes 18 as is known in the heat exchanger art. A mounting device 22 is secured to one of the walls 14 of one of the manifolds 12. The design, operation, and purpose of the mounting device 22 will be discussed in greater detail below. It should be appreciated that the subject invention may be satisfactorily used in other heat exchangers of any design, such as radiators and oil coolers, without deviating from the scope of the subject invention.

As discussed in the background section, a furnace brazing process may be used to secure the components, such as the manifolds 12, tubes 18, fins 20, and mounting device 22, together at the same time. The brazing process, however, often results in contaminants, such as clad and/or flux, migrating into critical sealing surfaces of the mounting device 22. The mounting device 22 of the subject invention is designed to prevent the intrusion of these contaminants into any critical sealing surfaces.

Referring to FIGS. 2–4, one of the manifolds 12 and the mounting device 22 are illustrated in greater detail. At least one of the walls 14 of the manifold 12 has at least one aperture 24. Preferably, there are a pair of apertures 24 formed within one wall of the manifold 12.

The mounting device 22 of this embodiment is configured as a substantially rectangular mounting block. As shown in FIG. 2, the mounting device 22 is secured to the wall of the manifold 12 aligned with the apertures 24. As also shown in FIGS. 3 and 4, the mounting device 22 includes at least one seat portion 26, which defines a critical sealing surface for the mounting device 22. Preferably, there are a pair of seat portions 26 each adapted to receive a fluid transmission line 28,30. In particular, one of the transmission lines 28 is an inlet for the manifold 12 and the other of the transmission lines 30 is an outlet for the manifold 12. The fluid transmission lines 28, 30 maybe used to transfer refrigerant, transmission fluid, oil, or the like.

The mounting device 22 further includes an opening 32 extending from each of the seat portions 26 aligned with each of the apertures 24 for providing a fluid passageway between the manifold 12 and the fluid transmission lines 28,30. Specifically, the mounting device 22 includes an exterior surface 34 with a body portion 36 and a mating portion 38. The openings 32 extending from the seat portions 26 to the mating portions 38. The mating portions 38 extend into the apertures 24 to secure the mounting device 22 to the manifold 12. Hence, in the most preferred embodiment, which includes two transmission lines 28,30, there are a pair of apertures 24 in the manifold 12, a pair of mating portions 38 disposed in the apertures 24, and a pair of openings 32 extending between the seat portions 26 and the mating portions 38. The openings 32 each include a larger diameter section and a smaller diameter section with a tapered section merging the larger and smaller diameter sections together. The larger diameter sections are sized to receive their respective transmission lines 28,30 with the smaller diameter sections being a part of the mating portions 38.

As shown in FIG. 2, the mounting device 22 further includes a threaded bore 40 disposed between the openings 32. A coupling plate 42 is adapted to support each of the fluid transmission lines 28,30 and is mounted to the mounting device 22 by a bolt 44 threaded into the threaded bore 40. A sealing ring 46 is disposed on each of the seat portions 26 when the coupling plate 42 is mounted to the mounting device 22.

To ensure that contaminants to not migrate and infiltrate the seat portions 26, the mounting device 22 further includes at least one indentation 48 formed therein for capturing the contaminants and preventing intrusion of the contaminants into the seat portion 26. As appreciated, there may be any number of indentations 48 disposed on any interior or exterior portion of the mounting device 22 without deviating from the overall scope of the subject invention.

As best shown in FIG. 2, the indentation 48 is further defined as an interior groove 50 formed within the opening 32 of the mounting device 22 for capturing contaminants within the opening 32. Preferably, the mounting device 22 further includes an interior groove 50 formed within each of the openings 32 for capturing contaminants within both of the openings 32. The groove disrupts the flow of contaminants from inside the manifold 12 to prevent the contaminants from reaching the seat portion 26. The disruption is accomplished by at least one of or a combination of redirecting the flow of contaminants, filling the groove with the contaminants, and/or capillary action. The size, i.e., depth and width, of the groove can be varied to provide the desired filling volume and/or capillary action.

As best shown in FIGS. 2 and 4, the indentation 48 is further defined as an exterior groove 52 formed within the exterior surface 34 of the mounting device 22 for capturing contaminants on the exterior surface 34. Preferably, the exterior surface 34 of the mounting device 22 includes a plurality of exterior grooves 52 formed therein. Even more preferably, the exterior grooves 52 are formed within the body portion 36 for capturing contaminants on the body portion 36. The exterior grooves 52 are illustrated as three concentric grooves extending around the entire perimeter of the body portion 36.

As discussed above with the interior grooves 50, the exterior grooves 52 likewise interrupt the flow of contaminants from the exterior surface 34 of the mounting device 22 and the outside of the manifold 12. In particular, the disruption occurs by changing the direction of the fluid flow and/or capturing the contaminants by allowing the exterior grooves 52 to fill with contaminants and/or by capillary action. The size, number, and spacing of the exterior grooves 52 can be modified as desired.

Figure 5:
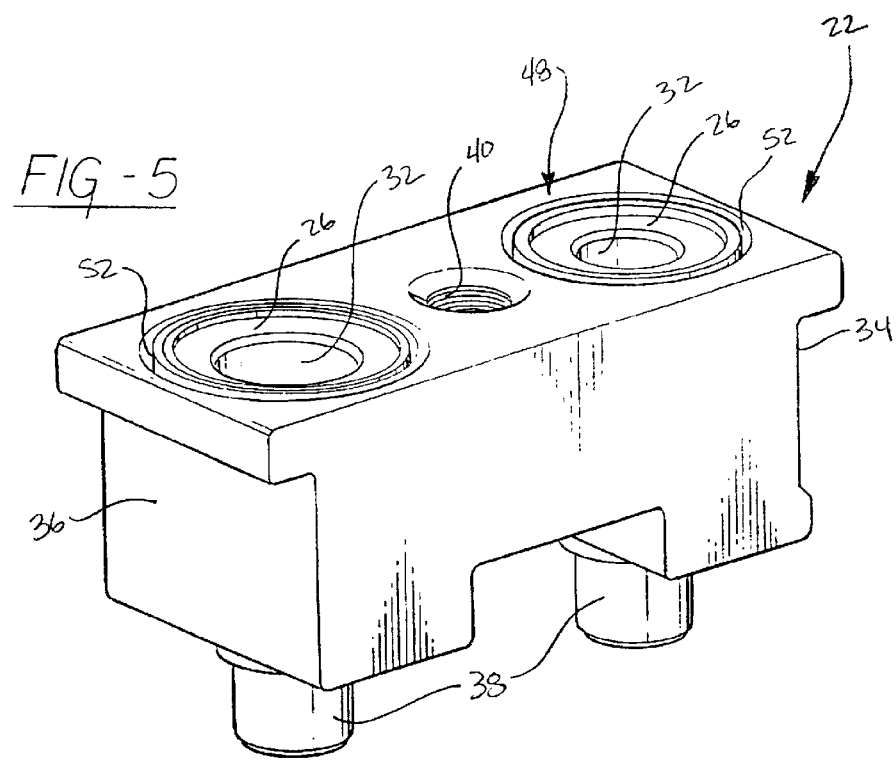
FIG. 5 is a perspective view of an alternative embodiment of a mounting device.

FIG. 5 illustrates an alternative embodiment of the mounting device 22 wherein the exterior grooves 52 are formed within the exterior surface 34 adjacent each of the seat portions 26 for capturing contaminants. The exterior grooves 52 adjacent the seat portions 26 may be used in conjunction with exterior grooves 52 disposed elsewhere on the mounting device 22.

Figure 6:
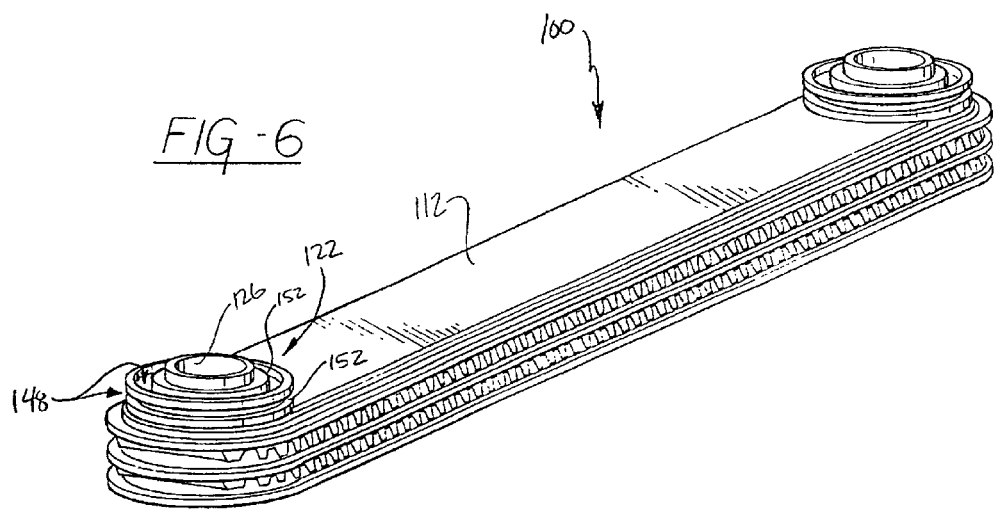
FIG. 6 is a perspective view of an alternative embodiment of the heat exchanger assembly.
Figure 7:
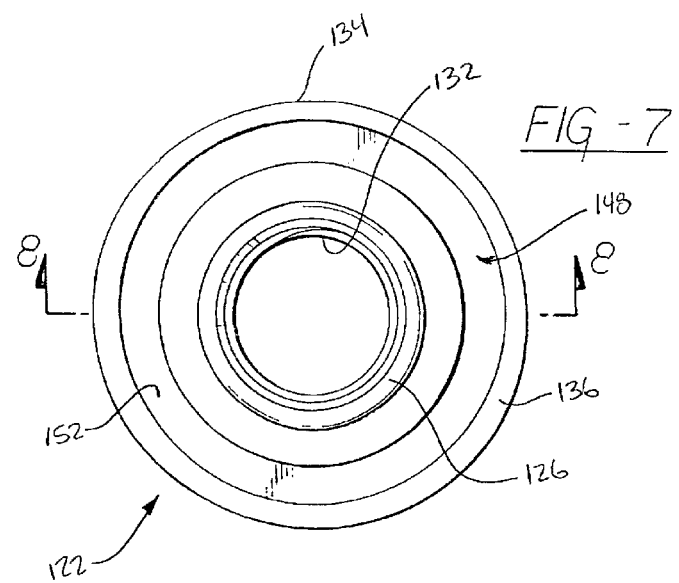
FIG. 7 is a top view of a mounting device from the heat exchanger assembly of FIG. 6.
Figure 8:
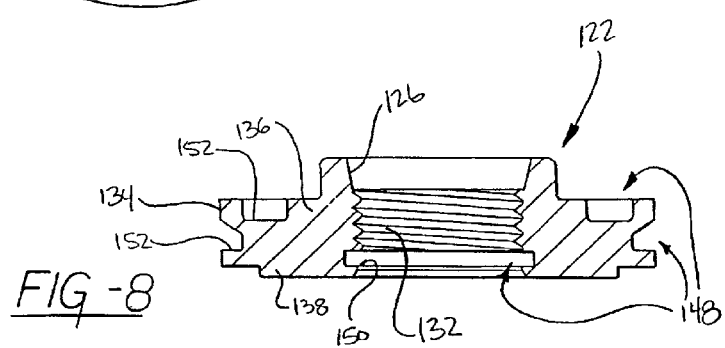
FIG. 8 is a cross-sectional view taken along line 8—8 of FIG. 7.

FIG. 6 illustrates an alternative embodiment of the heat exchanger assembly wherein like numerals increased by one hundred indicate like or corresponding parts throughout the several views. In particular, the heat exchanger assembly 100 of FIG. 6 is an oil cooler 100. The oil cooler 100 includes a manifold 112 having walls 114 which define a chamber 116 for retaining fluid therein. Referring also to FIGS. 7 and 8, a pair of mounting devices 122 are secured to the manifold 112. In this embodiment, the mounting devices 122 are substantially annular mounting rings disposed at opposite ends of the manifold 112. Although not illustrated in this Figure, an inlet fluid transmission line would be connected to one of the mounting devices 122 with an outlet fluid transmission line connected to the other mounting device 122.

The mounting device 122 is secured to the wall of the manifold 112 and aligned with an aperture (not shown) in the manifold 112. The mounting device 122 includes at least one seat portion 126 adapted to receive the associated fluid transmission line, which defines a critical sealing surface for the mounting device 122. The mounting device 122 further includes an opening 132 extending from the seat portion 126 and aligned with the aperture 24 for providing a fluid passageway between the manifold 112 and the fluid transmission line. Specifically, the mounting device 122 includes an exterior surface 134 with a body portion 136 and a mating portion 138. The opening 132 extends from the seat portion 126 to the mating portion 138. The mating portion 138 extends into the aperture 24 to secure the mounting device 122 to the manifold 112. The opening 132 is preferably threaded to receive a threaded transmission line.

To ensure that contaminants do not migrate and infiltrate the seat portion 126, the mounting device 122 further includes at least one indentation 148 formed therein for capturing the contaminants and preventing intrusion of the contaminants into the seat portion 126. As appreciated, there may be any number of indentations 148 disposed on any interior or exterior portion of the mounting device 122 without deviating from the overall scope of the subject invention.

As best shown in FIG. 8, the indentation 148 is further defined as an interior groove 150 formed within the opening 132 of the mounting device 122 for capturing contaminants within the opening 132. The groove disrupts the flow of contaminants from inside the manifold 112 enough to prevent the contaminants from reaching the seat portion 126. The disruption is accomplished by at least one of or a combination of redirecting the flow of contaminants, filling the groove with the contaminants, and/or capillary action. The size, i.e., depth and width, of the groove can be varied to provide the desired filling volume and/or capillary action.

As best shown in FIGS. 6–8, the indentation 148 is further defined as an exterior groove 152 formed within the exterior surface 134 of the mounting device 122 for capturing contaminants on the exterior surface 134. Preferably, the exterior groove 152 is formed within the body portion 136 for capturing contaminants on the body portion 136. As discussed above with the interior grooves 150, the exterior grooves 152 likewise interrupt the flow of contaminants from the exterior surface 134 of the mounting device 122 and the outside of the manifold 112. In particular, the disruption occurs by changing the direction of the fluid flow and/or capturing the contaminants by allowing the exterior grooves 152 to fill with contaminants and/or by capillary action.

In addition, one of the exterior grooves 152 can be formed in the exterior surface 134 adjacent the seat portion 126 for capturing contaminants. As illustrated, the exterior groove 152 adjacent the seat portion 126 is used in conjunction with the exterior groove 152 disposed elsewhere on the body portion 136 of the mounting device 122.

Obviously, many modifications and variations of the present invention are possible in light of the above teachings and the invention may be practiced otherwise than as specifically described within the scope of the appended claims.

What is claimed is:

1. A heat exchanger assembly for a vehicle comprising:
at least one manifold having walls defining a chamber for retaining fluid therein with at least one of said walls having at least one aperture;
a mounting device secured to said wall of said manifold and aligned with said aperture;
said mounting device including at least one seat portion adapted to receive a fluid transmission line and including an exterior surface;
said mounting device further including an opening extending from said seat portion and aligned with said aperture for providing a fluid passageway between said manifold and the fluid transmission line with said opening defining an interior surface;
said mounting device further including a pair-of-walls extending into at least one of said interior and exterior surfaces of said mounting device to form a groove defined by said walls within said mounting device for capturing contaminants and preventing an intrusion of the contaminants into said seat portion.

2. An assembly as set forth in claim 1 wherein said pair of walls extends into said interior surface such that said groove is further defined as an interior groove formed within said opening of said mounting device for capturing contaminants within said opening.

3. An assembly as set forth in claim 1 wherein said pair of walls extends into said exterior surface such that said groove is further defined as an exterior groove formed within said exterior surface for capturing contaminants on said exterior surface.

4. An assembly as set forth in claim 3 wherein said mounting device includes a series of paired walls extending into said exterior surface to form a plurality of exterior grooves.

5. An assembly as set forth in claim 2 wherein said pair of walls extends into said exterior surface such that said groove is further defined as an exterior groove formed within said exterior surface for capturing contaminants on said exterior, surface.

6. An assembly as set forth in claim 5 wherein said exterior groove is formed within said exterior surface adjacent said seat portion.

7. An assembly as set forth in claim 5 wherein said mounting device includes a body portion and a mating portion with said exterior groove formed within said body portion for capturing contaminants on said body portion.

8. An assembly as set forth in claim 7 wherein said body portion of said mounting device includes a series of paired walls extending into said exterior surface of said body portion to form a plurality of exterior grooves in said body portion.

9. An assembly as set forth in claim 7 wherein said opening of said mounting device extends from said seat portion to said mating portion with said mating portion extending into said aperture to secure said mounting device to said manifold.

10. An assembly as set forth in claim 9 wherein said wall of said manifold further includes a pair of apertures and said mounting device further includes a pair of mating portions disposed within said apertures to secure said mounting device to said manifold.

11. An assembly as set forth in claim 10 wherein said mounting device further includes a pair of seat portions each adapted to receive a fluid transmission line, and a pair of openings extending between said seat portions and said mating portions with said openings defining a pair of interior surfaces.

12. An assembly as set forth in claim 11 wherein said mounting device further includes a pair of walls extending into each of said interior surfaces to form a corresponding interior groove defined by said walls within each of said openings of said mounting device for capturing contaminants within said openings.

13. An assembly as set forth in claim 12 wherein said mounting device further includes a series of paired walls extending into said exterior surface of said body portion to form a plurality of exterior grooves formed within said exterior surface of said body portion for capturing contaminants on said exterior surface.

14. An assembly as set forth in claim 12 wherein said mounting device further includes an exterior groove formed within said exterior surface adjacent each of said seat portions for capturing contaminants.

15. An assembly as set forth in claim 11 wherein said mounting device further includes a threaded bore disposed between said openings.

16. An assembly as set forth in claim 15 further including a coupling plate adapted to support each of said fluid transmission lines and being mounted to said mounting device by a bolt threaded into said threaded bore.

17. An assembly as set forth in claim 16 further including an sealing ring disposed on each of said seat portions when said coupling plate is mounted to said mounting device.

* * * * *